United States Patent
Takahashi et al.

(10) Patent No.: US 7,687,158 B2
(45) Date of Patent: Mar. 30, 2010

(54) PERPENDICULAR MAGNETIC RECORDING MEDIUM AND PERPENDICULAR MAGNETIC RECORDING/REPRODUCING APPARATUS

(75) Inventors: Migaku Takahashi, 20-2, Hitokita 2-chome, Taihaku-ku, Sendai-shi, Miyagi-ken (JP); Masahiro Oka, Yokohama (JP); Akira Kikitsu, Yokohama (JP)

(73) Assignees: Migaku Takahashi, Miyagi-ken (JP); Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 295 days.

(21) Appl. No.: 11/666,309

(22) PCT Filed: Oct. 28, 2005

(86) PCT No.: PCT/JP2005/020244
§ 371 (c)(1),
(2), (4) Date: Apr. 26, 2007

(87) PCT Pub. No.: WO2006/046776
PCT Pub. Date: May 4, 2006

(65) Prior Publication Data
US 2007/0259214 A1   Nov. 8, 2007

Related U.S. Application Data

(60) Provisional application No. 60/625,120, filed on Nov. 5, 2004.

(30) Foreign Application Priority Data
Oct. 29, 2004   (JP)   ............................. 2004-316222

(51) Int. Cl.
G11B 5/66   (2006.01)

(52) U.S. Cl. .................................................. 428/831.2
(58) Field of Classification Search ....................... None
See application file for complete search history.

(56) References Cited

U.S. PATENT DOCUMENTS 6,562,453 B1 *   5/2003   Futamoto et al. ............ 428/332

(Continued)

FOREIGN PATENT DOCUMENTS

JP   2001-23140 A   1/2001

(Continued)

OTHER PUBLICATIONS

Machine translation of JP 2001-093139, Japan, Apr. 2001.*

(Continued)

*Primary Examiner*—Holly Rickman
(74) *Attorney, Agent, or Firm*—Sughrue Mion, PLLC

(57) ABSTRACT

The invention provides a perpendicular magnetic recording medium in which the recording density is greatly increased with little deviation of the crystal structure. A perpendicular magnetic recording medium has at least a soft magnetic under layer, an orientation control layer, a perpendicular magnetic layer, and a protective layer, which are formed on a nonmagnetic substrate, the orientation control layer consisting of a plurality of layers including a seed layer and an intermediate layer from the substrate side. Preferably, the seed layer and the intermediate layer each have a hexagonal close-packed (hcp) structure, and the average grain size of the seed layer is between 8 nm and 20 nm. The main component of the seed layer is preferably Mg, and the main component of the intermediate layer is preferably Ru.

6 Claims, 1 Drawing Sheet

U.S. PATENT DOCUMENTS

| | | | |
|---|---|---|---|
| 7,175,925 B2 * | 2/2007 | Chen et al. | 428/831 |
| 2004/0001975 A1 | 1/2004 | Hikosaka et al. | |
| 2004/0072027 A1 * | 4/2004 | Lu et al. | 428/694 R |
| 2005/0255336 A1 * | 11/2005 | Mukai | 428/831 |
| 2007/0026261 A1 * | 2/2007 | Marinero et al. | 428/831.2 |

FOREIGN PATENT DOCUMENTS

| | | |
|---|---|---|
| JP | 2001-93139 A | 4/2001 |
| JP | 2001-243618 A | 9/2001 |
| JP | 2004-30767 A | 1/2004 |

OTHER PUBLICATIONS

Machine translation of JP 2001-243618, Japan, Sep. 2001.*

* cited by examiner

PERPENDICULAR MAGNETIC RECORDING MEDIUM AND PERPENDICULAR MAGNETIC RECORDING/REPRODUCING APPARATUS

CROSS REFERENCE TO RELATED APPLICATIONS

This application is a National Stage of International Application No. PCT/JP2005/020244, filed on Oct. 28, 2005, which claims benefit pursuant to 35 U.S.C. §119 (e) of U.S. Provisional Application No. 60/625,120, filed Nov. 5, 2004, and priority based on Japanese Patent Application No. 2004-316222, filed Oct. 29, 2004, the contents of all of which are incorporated herein by reference.

TECHNICAL FIELD

The present invention relates to a magnetic recording medium used in a hard disk apparatus and the like, and particularly relates to a perpendicular magnetic recording medium and a magnetic recording/reproducing apparatus which uses the medium.

BACKGROUND ART

Recently, there has been a noticeable increase in the application of magnetic recording/reproducing apparatus such as magnetic disk apparatus, flexible disk apparatus, and magnetic tape apparatus. The increasing importance of such apparatus is accompanied by a demand to noticeably improve the recording density of magnetic recording media used in these apparatus. In particular, since the introduction of MR heads and PRML techniques, the rise of recording density has increased markedly, and in recent years the introduction of GMR heads, TMR heads, and the like, continues to increase at a pace of approximately 100% each year.

Thus there is a demand to achieve even higher recording density than hitherto, and accordingly to achieve a magnetic recording layer which has high coercivity, a high signal-to-noise ratio (SNR), and high resolution. In hitherto longitudinal magnetic recording systems were widely used. When the linear recording density increases, demagnetization field becomes dominant and weakens the magnetization in adjacent recording magnetic domains. To avoid this, the magnetic recording layer must be made even thinner.

On the other hand, as the magnetic recording layer is made thinner, the thermal energy at room temperature and the energy barrier for maintaining the magnetic domains approach the same level. This is said to make it impossible to ignore relaxation of the recorded magnetization quantity due to the effect of temperature (thermal fluctuation) and limit the linear recording density.

In view of this, an anti-ferro coupling (AFC) medium has recently been proposed as a technique for improving the linear recording density of longitudinal magnetic recording systems, and effort are being made to avoid thermomagnetic relaxation which is a problem in longitudinal magnetic recording.

Perpendicular magnetic recording techniques are attracting attention as a powerful way of improving recording density in the future. In contrast to conventional longitudinal magnetic recording systems, in which the medium is magnetized in the in-plane direction, perpendicular magnetic recording systems magnetize in a direction which is perpendicular to the surface of the medium. It is thought that this makes it possible to avoid the effects of demagnetization, which is an obstacle to achieving high linear recording density in longitudinal magnetic recording systems, and is therefore ideal for high-density recording. Since the thickness of the magnetic layer can be kept constant, the effects of thermomagnetic relaxation, which is problematic in longitudinal magnetic recording, are comparatively small.

A perpendicular magnetic recording medium generally consists of a seed layer, an intermediate layer, a magnetic recording layer, and a protective layer, which are grown successively on a nonmagnetic substrate. After these layers are grown as far as the protective layer, a lubricating layer is often applied to the surface. In many cases, a magnetic film known as a soft magnetic under layer is provided underneath the layers. The purpose of the intermediate layer is to enhance the characteristics of the magnetic recording layer. The seed layer is to control the size of the magnetic crystal as well as the crystal orientation of the intermediate layer and the magnetic recording layer.

The crystal structure of the magnetic recording layer is important in manufacturing a perpendicular magnetic recording medium having excellent characteristics. In many perpendicular magnetic recording media, the crystal structure of the magnetic recording layer has a hexagonal close-packed (hcp) structure wherein it is important that the (002) crystal plane is parallel to the substrate surface; in other words, it is important that the crystal C axis ([002]) is aligned vertically with as little deviation as possible. However, while perpendicular magnetic recording media have an advantage of allowing use of a comparatively thick magnetic recording layer, they have a drawback that the total thickness of the stacked thin-film of the entire medium tends to be thicker than that of current longitudinal magnetic recording media, and this is liable to cause deviation of the crystal structure during the medium stacking process.

One disclosed perpendicular magnetic recording medium includes an orientation control layer containing a non-crystal section, a grain size control layer, and an under layer having either a hexagonal close-packed (hcp) structure or a face-centered cubic (fcc) structure, which are provided between the soft magnetic layer and the perpendicular magnetic recording layer (e.g. see Patent Document 1).

Another disclosed perpendicular magnetic recording medium includes another crystal MgO film having a (100) plane which is broadly parallel to the substrate, this crystal MgO film being inserted between a magnetic under layer and a perpendicular magnetic recording layer (e.g. see Patent Document 2).

Thus, while various techniques have been used in the growth process in order to obtain a perpendicular magnetic recording medium having an excellent crystal structure, there is still a demand for further technological improvements to obtain even better recording and reproducing characteristics.

Patent Document 1: Japanese Unexamined Patent Publication No. 2004-30767

Patent Document 2: Japanese Unexamined Patent Publication No. 2001-23140

DISCLOSURE OF INVENTION

It is an object of this invention, in a perpendicular magnetic recording medium attracting attention as a next-generation high recording density medium technique, to markedly improve the crystal structure and thereby substantially increase the recording density.

By scrutinizing the material used in an orientation control layer of a perpendicular magnetic layer in a perpendicular magnetic recording medium, this invention aims to provide a perpendicular magnetic recording medium which has little deviation of its crystal structure.

To achieve the above objects, this invention provides the following:

(1) A perpendicular magnetic recording medium having at least a soft magnetic under layer, an orientation control layer, a perpendicular magnetic layer, and a protective layer, which are formed on a nonmagnetic substrate. The orientation control layer consists of a plurality of layers including a seed layer and an intermediate layer from the substrate side. The seed layer and the intermediate layer each have a hexagonal close-packed (hcp) structure.

(2) The perpendicular magnetic recording medium according to (1), wherein at least one layer of the seed layers is a metal layer or a layer having metal as its main component.

(3) A perpendicular magnetic recording medium having at least a soft magnetic under layer, an orientation control layer, a perpendicular magnetic layer, and a protective layer, which are formed on a nonmagnetic substrate. The orientation control layer consists of a plurality of layers including a seed layer and an intermediate layer from the substrate side. At least one layer of the seed layers is a metal layer or a layer having metal as its main component, and the intermediate layer has a hexagonal close-packed (hcp) structure.

(4) The perpendicular magnetic recording medium according to one of (1) to (3), wherein the average grain size of the seed layer is between 8 nm and 20 nm.

(5) The perpendicular magnetic recording medium according to one of (1) to (4), having a seed layer of which the main component is the element to which ruthenium have a contact angle of between 50 degrees and 120 degrees.

(6) The perpendicular magnetic recording medium according to one of (1) to (5), wherein at least one layer of the seed layer is a magnesium layer or a layer having magnesium as its main component.

(7) The perpendicular magnetic recording medium according to one of (1) to (6), wherein at least one layer of the intermediate layer is a ruthenium layer or a layer having ruthenium as its main component.

(8) The perpendicular magnetic recording medium according to one of (1) to (7), wherein at least one layer of the intermediate layer is (002) oriented.

(9) A perpendicular magnetic recording and reproducing device which uses the perpendicular magnetic recording medium according to one of (1) to (8).

According to this invention, it is possible to provide a perpendicular magnetic recording medium in which the crystal structure of the perpendicular magnetic layer, in particular the C axis of the hexagonal close-packed (hcp) structure, is oriented such that it has extremely small angle dispersion to the substrate surface, and in addition, the average grain size of the magnetic grain which form the perpendicular magnetic layer is extremely fine, and the perpendicular magnetic recording medium has excellent high recording density capability.

BEST MODE FOR CARRYING OUT THE INVENTION

The content of this invention will be explained specifically.

Figure 1:
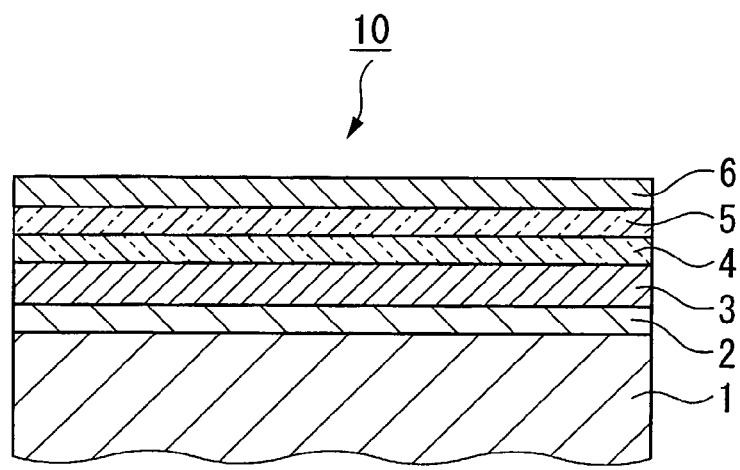
FIG. 1 is a cross-sectional structural view of a perpendicular magnetic recording medium of this invention.

As shown in FIG. 1, a perpendicular magnetic recording medium 10 of this invention is composed by providing, on a nonmagnetic substrate 1, at least the following: a soft magnetic under layer (SUL) 2, a seed layer 3 and an intermediate layer 4 which form an orientation control layer for controlling the orientation of a layer directly above, a perpendicular magnetic layer 5 whose easy magnetizing axis is mainly perpendicular to the substrate, and a protective layer 6. The orientation control layer consists of a plurality of layers including the seed layer 3 and the intermediate layer 4 from the substrate side.

Any nonmagnetic substrate can be used as the nonmagnetic substrate used in the magnetic recording medium of this invention, such as, for example, an Al alloy substrate having Al as its main component such as an Al—Mg alloy, a substrate composed of normal soda glass, aluminosilicate glass, non-crystal glass types, silicon, titanium, ceramics, various types of resin, and so on. Of these, Al alloy substrates and glass substrates such as crystallized glass, amorphous glass, and so on, are mostly used.

When manufacturing a magnetic disk, it is usual to firstly clean and dry the substrate; similarly in this invention, to maintain the adhesiveness of the layers, the substrate should preferably be cleaned and dried before forming the layers. There are no limitations on the substrate size.

Next, each layer of the perpendicular magnetic recording medium will be explained.

Soft magnetic under layers (SULs) are often provided in perpendicular magnetic recording media. At the time of recording a signal on the medium, the soft magnetic under layer collects the recording magnetic field from the head and efficiently prints the perpendicular component of the recording magnetic field on the magnetic recording layer. A material having soft magnetic characteristics such as FeCo alloy, CoZrNb alloy, CoTaZr alloy, can be used as the material for the SUL. Instead of these single soft magnetic layers, a trilayer structure, where an ultra-thin non magnetic layer such as Ru or the like is inserted midway of the SUL to achieve anti-ferromagnetic coupling between above and beneath layers, can be used. While the layer thickness of the recording layer is approximately between 2 nm and 20 nm, it may be set appropriately according to the balance between the recording reproduction characteristics and the over write (OW) characteristics. It is generally between approximately 5 nm and 15 nm.

In this invention, an orientation control layer for controlling the crystal orientation of a film directly above is provided on the soft magnetic under layer. The orientation control layer consists of a plurality of layers, which are termed a seed layer and an intermediate layer from the substrate side, respectively.

Preferably in this invention, the seed layer should have a hexagonal close-packed (hcp) structure or a face-centered cubic (fcc) structure, and the average grain size of the seed layer should be between 8 nm and 20 nm.

The intermediate layer has a hexagonal close-packed (hcp) structure. The seed layer and the intermediate layer can both have hexagonal close-packed (hcp) structures.

According to this structure, the crystal structure of the intermediate layer and the magnetic recording layer which are grown thereabove can be oriented to the hcp (002) plane, thereby obtaining a perpendicular magnetic recording medium having excellent recording and reproducing characteristics.

The seed layer is extremely important for improving the magnetic characteristics and the recording/reproducing characteristics of the magnetic recording layer, and is epitaxially grown in a hexagonal close-packed (hcp) structure in the same manner as the magnetic recording layer.

The crystal structure of the material used for the seed layer in this invention should preferably be a hexagonal close-packed (hcp) structure or a face-centered cubic (fcc) structure. The average grain size of the seed layer should be at least 8 nm, and the contact angle of the intermediate layer material to the seed layer material should be at least 50°.

In particular in this invention, the element which forms the main component of the seed layer should be one to which contact angle of ruthenium is between 50 degrees and 120 degrees.

When a seed layer which satisfies these conditions is used, the crystal orientation of the intermediate layer grown thereupon has very little angle dispersion and the average grain size is liable to be very small.

Here, the average grain size is the average diameter obtained when the micro-structure of the film is observed by, for example, transmission electron microscopy or the like, and an average value is determined by statistically processing the diameters of grains which are observed in clear separation. When the average grain size of the seed layer is between 8 nm and 20 nm, the grain size of the intermediate layer can be controlled fine. The contact angle is the measurement of a drop, which is formed when a molten intermediate layer material is dripped onto the material as a solid state used for the seed layer, expressed as its contact angle with the surface of the solid substance, and is generally an indicator of the wettability with respect to the intermediate layer material. That is, when the material of the intermediate layer does not have particularly high wettability with respect to the material of the seed layer, it is easier to form fine crystal particles when the intermediate layer is deposited on the seed layer.

Detailed investigation has revealed that when a material having a contact angle of between 50 degrees and 120 degrees in bulk is used, these characteristics are maintained in the thin film intermediate layer, and the grain size of the intermediate layer becomes extremely small. Therefore, a material to which a intermediate layer material have a contact angle of between 50 degrees and 120 degrees in bulk, should be used as the seed layer material. This type of material is generally listed in data books and so on.

Magnesium (Mg) is one example of a material which satisfies such conditions. An appropriate magnesium film is one which is formed in a hexagonal close-packed (hcp) structure and has a grain size of approximately 13 nm. It is also appropriate in that its contact angle to Ru is 80 degrees. While a pure magnesium material without additives can be used, an alloy containing no less than half of magnesium is appropriate.

The intermediate layer of this invention is used to efficiently enhance the perpendicular orientation of the magnetic recording layer. The intermediate layer itself has a hexagonal close-packed (hcp) structure and allows the magnetic recording layer to be grown epitaxially. Since the crystal orientation of this intermediate layer basically determines the crystal orientation of the magnetic recording layer, it is extremely important to control the orientation of the intermediate layer during manufacturing. Also, if the average grain size of the intermediate layer can be controlled, the grain size of the magnetic recording layer becomes extremely fine since the grains of the magnetic recording layer grow continuously thereupon. It is said that the finer the crystal particles of the magnetic recording layer, the greater the signal-to-noise ratio (SNR). A thin film of Ru or an Ru alloy are examples of materials which are widely used as an intermediate layer satisfying these conditions.

In this invention, the intermediate layer may be stacked from a thin film of Ru or an Ru alloy, with at least one layer of the intermediate layer being oriented to (002). As mentioned earlier, in many perpendicular magnetic recording media, the crystal structure of the magnetic recording layer has a hexagonal close-packed (hcp) structure, it being important that the (002) crystal plane is parallel to the substrate surface, in other words that the crystal C axis ([002]) is arranged in the perpendicular direction with as little deviation as possible. An X-ray rocking curve method can be used to evaluate this property. Firstly, a film deposited on the substrate is placed in an X-ray Diffractometer (XRD), and the crystal plane which is parallel to the surface of the substrate is analyzed. When the sample includes a film having a hexagonal close-packed (hcp) structure such as the intermediate layer and the magnetic recording layer mentioned above, the diffraction peak corresponding to the crystal plane is measured. In the case of a perpendicular magnetic recording medium using a Co alloy, since the C axis ([002]) direction of the hexagonal close-packed (hcp) structure is arranged perpendicular to the substrate surface, the peak that corresponds to the (002) plane is measured. Then, the optical system is rotated towards the substrate surface while keeping the Bragg angle relationship of diffraction from this (002) plane. The diffraction intensity of the (002) plane is plotted against the rotation angle for a single diffraction peak. This is termed a Rocking curve. A sharp Rocking curve is obtained when the (002) plane is extremely parallel to the substrate surface; in contrast, a broad curve is obtained when the direction of the (002) plane is widely dispersed. Accordingly, a half-width of Rocking curve ($\Delta\theta 50$) is often used as an indicator of the degree of the crystal orientation of the perpendicular magnetic recording medium. According to this invention, a perpendicular magnetic recording medium having a small $\Delta\theta 50$ can be easily manufactured.

As its name implies, the magnetic recording layer is the layer that actually records the signal. Co alloy thin films such as CoCr, CoCrPt, CoCrPt—O, CoCrPt—$SiO_2$, and CoCrPt—$Cr_2O_3$, are often used as the material for this layer. The crystal structure and magnetic quality of this layer ultimately determine the recording and reproduction.

A DC sputtering method or an RF sputtering method are normally used to grow the above layers. While the sputtering gas pressure is determined as appropriate to optimize the characteristics of each layer, it is generally controlled with a range of approximately 0.1 Pa to 1.2 Pa. This is adjusted while observing the performance of the medium.

The protective layer protects the medium from damage incurred by contact with the head. While carbon film, $SiO_2$ film, and the like, can be used, carbon film is mostly used. While a sputtering method or a plasma CVD method may be used to grow the protective layer, in recent years the plasma CVD method is mostly used. The thickness of the protective layer should be between approximately 1 nm and 10 nm, preferably between approximately 2 nm and 6 nm, and ideally between 2 nm and 4 nm.

Figure 2:
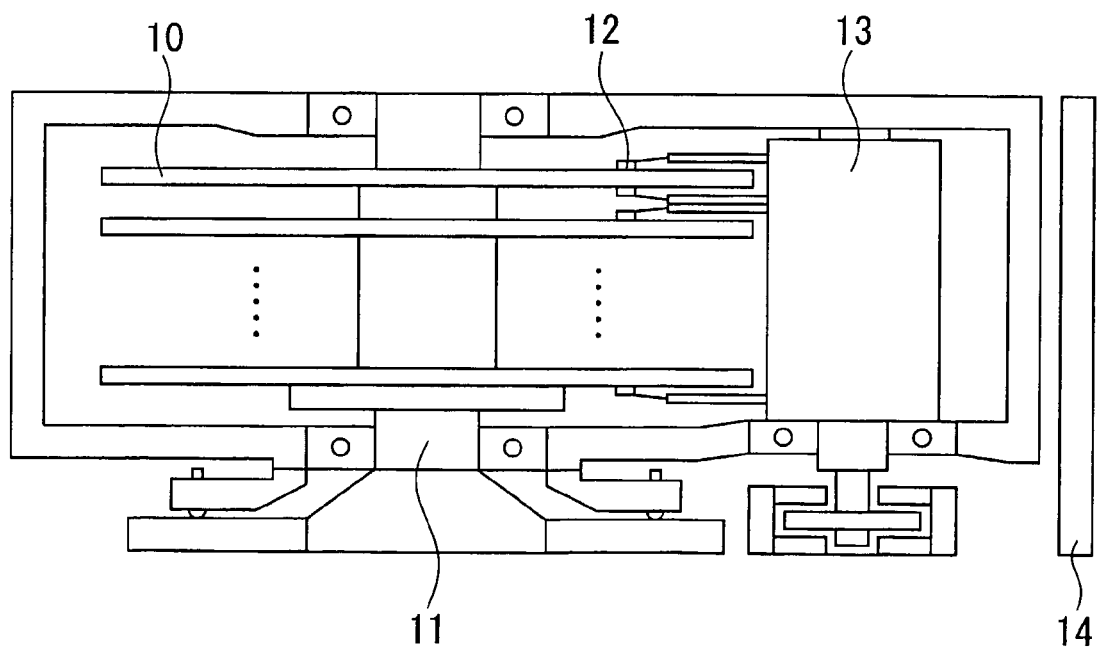
FIG. 2 is a cross-sectional structural view of a perpendicular magnetic recording/reproducing apparatus of this invention.

FIG. 2 is an example of a perpendicular magnetic recording/reproducing apparatus using the perpendicular magnetic recording medium described above. The perpendicular magnetic recording/reproducing apparatus shown in FIG. 2 comprises the magnetic recording medium 10 shown in FIG. 1, a spindle motor 11 which rotates the magnetic recording medium 10, a magnetic head 12 which records and reproduces data on the magnetic recording medium 10, a head actuator 13 which relatively moves the magnetic head 12 with respect to the magnetic recording medium 10, and a recording/reproducing signal processing system 14.

The recording/reproducing signal processing system 14 can process data input from the outside and send a recording signal to the magnetic head 12, and can process a reproduction signal from the magnetic head 12 and send data to the outside.

For the magnetic head 12 used in the magnetic recording and reproducing medium of this invention, it is possible to use not only a head which has a magneto resistance (MR) element using anisotropic magnetic resistance (AMR) as the reproducing element, but also a magnetic head which is more suitable for high recording density, such as one using a giant magneto resistance (GMR).

EXAMPLES, COMPARATIVE EXAMPLES

A vacuum chamber containing a glass substrate for HD was evacuated in advance to no more than $1.0 \times 10^{-5}$ Pa. The glass substrate used is made from crystallized glass consisting of $Li_2Si_2O_5$, $Al_2O_3+K_2O$, $MgO+P_2O_5$, and $Sb_2O_3+ZnO$. The surface roughness Ra is 5 Å or less, the outer diameter is 65 mm, and the inner diameter is 20 mm.

Next, a SUL of CoNbZr was formed to a thickness of 100 nm on the substrate by using a sputtering method, seed layers of Mg, Mg-10Al and Ti (hcp) were deposited to a thickness of 4 nm in Examples 1, 2 and 3, respectively. Also, seed layers of 4 nm of Ti (bcc), Ag, and Cu, were deposited on top of a similar SUL in Comparative Examples 1, 2 and 3, respectively. Two samples were manufactured for each example. Here, Ti film (hcp) was deposited on a substrate at room temperature. On the other hand, Ti film (bcc) was deposited on a hot substrate which was heated to 300° C. The crystal structures of Examples 1 to 3 and Comparative Examples 1 to 3 were confirmed using an XRD. The grain sizes of each seed layer were observed using transmission electron microscopy (TEM).

An intermediate layer of Ru, a magnetic recording layer of Co—Cr—Pt—$SiO_2$, and a protective layer of carbon film, were then deposited on the surfaces of the remaining samples to produce magnetic recording media.

Using crystallized glass, a soft magnetic under layer of CoNbZr, a seed layer of Mg, an intermediate layer of Ru, were then deposited in the same manner as Example 1. Seed layers were made using Mg (Example 4), Mg-10Al (Example 5), Ti (Example 6, hcp), Ti (Comparative Example 4, bcc), Ag (Comparative Example 5), and Cu (Comparative Example 6). An XRD was used to confirm that the crystal structure of the intermediate layer Ru has a hcp structure, and is oriented to the (002) plane. In addition, Δθ50 of the (002) plane was determined. The grain sizes of the intermediate layer Ru were observed using TEM.

Then, a magnetic recording layer of Co—Cr—Pt—$SiO_2$ and a protective layer of carbon film, were deposited on the surfaces of the remaining samples to produce magnetic recording media.

Similarly, using crystallized glass, a soft magnetic under layer of CoNbZr, a seed layer of Mg film, an intermediate layer of Ru films a magnetic recording layer of Co—Cr—Pt—$SiO_2$, and a protective layer of carbon film, were deposited. Seed layers were made using Mg (Example 7), Mg-10Al (Example 8), Ti (Example 9, hcp), Ti (Comparative Example 7, bcc), Ag (Comparative Example 8), and Cu (Comparative Example 9).

A lubricant was applied to each of these, and the recording/reproducing characteristics were measured using a head for perpendicular magnetic recording. Low-frequency output LF TAA, signal-to-noise ratio SNR, and reproduction pulse half-width PW50, were compared as representative parameters for the recording/reproducing characteristics. The results are listed in Table 1.

The crystal structure and the grain size of the orientation control layer, under a perpendicular magnetic layer and a protective layer, of Examples 7 to 9 and Comparative Examples 7 to 9 were also measured, and the results are the same as that of Examples 1 to 6 and Comparative Examples 1 to 6, as shown in Table 1.

TABLE 1

| | Seed layer Material | Crystalline Structure of Seed layer | Average Grain Size of Seed Layer (nm) | Crystal Orientation Distribution Δθ50 of Ru Intermediate Layer hcp (002) peak, (°) | Average Grain Size of Ru Intermediate Layer (nm) | LF TAA (mV) | SNR (dB) | PW 50 (nsec) |
|---|---|---|---|---|---|---|---|---|
| Example 1 Example 4 Example 7 | Mg | hcp | 13.0 | 4.3 | 7.8 | 3.012 | 28.5 | 7.0 |
| Example 2 Example 5 Example 8 | Mg-10Al | hcp | 13.0 | 4.3 | 7.7 | 3.020 | 28.6 | 7.1 |
| Example 3 Example 6 Example 9 | Ti | hcp | 8.2 | 4.4 | 7.9 | 3.000 | 28.5 | 7.2 |
| Comparative Example 1 Comparative Example 4 Comparative Example 7 | Ti | bcc | 9.1 | 4.5 | 8.5 | 3.001 | 27.5 | 7.8 |
| Comparative Example 2 | Ag | fcc | 6.0 | 7.2 | 8.5 | 2.999 | 27.4 | 7.7 |

TABLE 1-continued

| | Seed layer Material | Crystalline Structure of Seed layer | Average Grain Size of Seed Layer (nm) | Crystal Orientation Distribution Δθ50 of Ru Intermediate Layer hcp (002) peak, (°) | Average Grain Size of Ru Intermediate Layer (nm) | LF TAA (mV) | SNR (dB) | PW 50 (nsec) |
|---|---|---|---|---|---|---|---|---|
| Comparative Example 5 | | | | | | | | |
| Comparative Example 8 | | | | | | | | |
| Comparative Example 3 | Cu | fcc | 5.2 | 5.5 | 8.0 | 3.093 | 27.7 | 7.4 |
| Comparative Example 6 | | | | | | | | |
| Comparative Example 9 | | | | | | | | |

Thus, by using a material having Mg as its main component for the seed layer material, it is possible to introduce an intermediate layer which has an excellent crystal structure and a very fine average grain size, and thereby provide a perpendicular magnetic recording medium which has excellent recording and reproducing characteristics. In Examples 1 to 9, the crystal orientation distribution is small because of the small Δθ50, and then the grain size of Ru is small. As a result, SNR is improved and PW50 is small. The results indicate that the perpendicular magnetic recording mediums of the Examples 1 to 9 are suitable for higher recording density.

On the other hand, in Comparative Examples 1, 4 and 7, Δθ50 is small but the grain size of Ru is large. As a result, the improvements of SNR and PW50 are not enough.

FIG. 2 is an example of a magnetic recording/reproducing apparatus which uses the magnetic recording medium 10 having the structure described above. The magnetic recording/reproducing apparatus comprises the magnetic recording medium 10 having the structure described above, a spindle motor 11 which rotates the magnetic recording medium 10, a magnetic head 12 which records/reproduces data onto the magnetic recording medium 10, a head actuator 13, and a recording/reproducing signal processing system 14. The recording/reproducing signal processing system 14 can process input data and send a recording signal to the magnetic head 12, and can process a reproduction signal from the magnetic head 12 and output data.

This magnetic recording/reproducing apparatus uses a perpendicular magnetic recording medium which greatly increases the recording density without disturbing the crystal structure, and therefore serves as a magnetic recording/reproducing apparatus which has a stable large capacity.

INDUSTRIAL APPLICABILITY

According to this invention, it is possible to provide a perpendicular magnetic recording medium in which the crystal structure of the perpendicular magnetic layer, in particular the C axis of the hexagonal close-packed (hcp) structure, is oriented such that it has extremely small angle dispersion to the substrate surface, and in addition, the average grain size of the crystal particles which form the perpendicular magnetic layer is extremely fine, and the perpendicular magnetic recording medium has excellent high recording density.

The invention claimed is:

1. A perpendicular magnetic recording medium having at least a soft magnetic under layer, an orientation control layer, a perpendicular magnetic layer, and a protective layer, which are formed on a nonmagnetic substrate,
    wherein the orientation control layer comprises a plurality of layers including seed layers and intermediate layers from the substrate side, and the seed layers and the intermediate layers each having a hexagonal close-packed (hcp) structure, wherein
    at least one layer of the intermediate layers is a ruthenium layer or a layer having ruthenium as its main component, and
    the seed layer has as a main component an element to which ruthenium has a contact angle of between 50 degrees and 120 degrees.

2. A perpendicular magnetic recording medium having at least a soft magnetic under layer, an orientation control layer, a perpendicular magnetic layer, and a protective layer, which are formed on a nonmagnetic substrate,
    wherein the orientation control layer comprises a plurality of layers including seed layers and intermediate layers from the substrate side,
    the seed layers have a hexagonal close-packed (hcp) structure or a face-centered cubic (fcc) structure having an average grain size of from 8 nm to 20 nm,
    at least one layer of the intermediate layers is a ruthenium layer or a layer having ruthenium as its main component having a hexagonal close-packed (hcp) structure, and
    at least one layer of the seed layers has as a main component an element to which ruthenium has a contact angle of between 50 degrees and 120 degrees.

3. The perpendicular magnetic recording medium according to claim 1, wherein at least one layer of the seed layers is a magnesium layer or a layer having magnesium as its main component.

4. The perpendicular magnetic recording medium according to claim 1, wherein at least one layer of the intermediate layers is (002) oriented.

5. A perpendicular magnetic recording and reproducing device which uses the perpendicular magnetic recording medium according to claim 1.

6. A perpendicular magnetic recording medium having at least a soft magnetic under layer, an orientation control layer, a perpendicular magnetic layer, and a protective layer, which are formed on a nonmagnetic substrate,
    wherein the orientation control layer comprises a plurality of layers including seed layers and intermediate layers from the substrate side,
    the seed layer has a hexagonal close-packed (hcp) structure or a face-centered cubic (fcc) structure having an average grain size ranging from 13 nm to 20 nm, and a main component of the seed layer is an element to which ruthenium has a contact angle of between 50 degrees and 120 degrees, and the intermediate layer is a ruthenium layer or a layer having ruthenium as its main component.

* * * * *